(12) United States Patent  
Assulin et al.

(10) Patent No.: US 8,753,511 B2  
(45) Date of Patent: Jun. 17, 2014

(54) INTEGRATED BIOLOGICAL WASTEWATER TREATMENT AND CLARIFICATION

(75) Inventors: Nir Assulin, Herev-Laet (IL); Tamar Arbel, Karmiel (IL)

(73) Assignee: AQ-WISE—Wise Water Technologies Ltd., Herzilla (IL)

( * ) Notice: Subject to any disclaimer, the term of this patent is extended or adjusted under 35 U.S.C. 154(b) by 486 days.

(21) Appl. No.: 13/061,929

(22) PCT Filed: Aug. 26, 2009

(86) PCT No.: PCT/IL2009/000825
§ 371 (c)(1),
(2), (4) Date: Apr. 7, 2011

(87) PCT Pub. No.: WO2010/026564
PCT Pub. Date: Mar. 11, 2010

(65) Prior Publication Data
US 2011/0180473 A1    Jul. 28, 2011

Related U.S. Application Data

(60) Provisional application No. 61/191,023, filed on Sep. 3, 2008.

(51) Int. Cl.
*C02F 3/30* (2006.01)
*C02F 3/06* (2006.01)

(52) U.S. Cl.
USPC ............ 210/605; 210/615; 210/631; 210/260

(58) Field of Classification Search
USPC ......... 210/605, 615, 616, 617, 629, 631, 150, 210/252, 259, 260
See application file for complete search history.

(56) References Cited

U.S. PATENT DOCUMENTS

| 1,498,360 A | 6/1924 | Douglas |
| 1,790,975 A | 2/1931 | Dallas et al. |

(Continued)

FOREIGN PATENT DOCUMENTS

| DE | 3916520 A1 | 11/1990 |
| EP | 0025309 A1 | 3/1981 |

(Continued)

OTHER PUBLICATIONS

An Office Action dated Sep. 24, 2012, together with the English translation, which issued during the prosecution of Israel Patent Application No. 196647.

(Continued)

*Primary Examiner* — Fred Prince
(74) *Attorney, Agent, or Firm* — Edwards Wildman Palmer LLP; Barry Kramer; Lisa Swiszcz (57) ABSTRACT

Apparatus for integrated biological wastewater treatment and clarification including a tank having a wastewater inlet for receiving wastewater to be treated and having a treated, clarified wastewater outlet for providing treated, clarified wastewater for use, the tank having an upper turbulence region, a lower solids settling region below the upper turbulence region and a sludge collection region below the lower solids settling region, a multiplicity of biomass carriers disposed in the upper turbulence region, a gas diffuser assembly arranged generally between the upper turbulence region and the lower solids settling region for providing gas bubbles which move upwardly through the wastewater and the biomass carriers in the upper turbulence region, providing turbulence and oxygen and a sludge removal conduit communicating with the sludge collection region for removal of sludge therefrom.

17 Claims, 6 Drawing Sheets

(56) References Cited

U.S. PATENT DOCUMENTS

| | | |
|---|---|---|
| 2,709,128 A | 5/1955 | Krause |
| 3,133,017 A | 5/1964 | Lambeth |
| 3,506,125 A | 4/1970 | Willis et al. |
| 3,788,477 A | 1/1974 | Love |
| 3,956,128 A | 5/1976 | Turner |
| 3,957,931 A | 5/1976 | Ellis et al. |
| 4,045,344 A | 8/1977 | Yokota |
| 4,137,171 A | 1/1979 | Yokata |
| 4,159,945 A | 7/1979 | Savage |
| 4,173,531 A | 11/1979 | Matsch et al. |
| 4,177,144 A | 12/1979 | Hickey et al. |
| 4,179,366 A | 12/1979 | Kaelin |
| 4,188,289 A | 2/1980 | Besik |
| 4,231,863 A | 11/1980 | Sutphin |
| 4,244,531 A | 1/1981 | Szegvari |
| 4,256,573 A | 3/1981 | Shimodaira et al. |
| 4,279,753 A | 7/1981 | Nielson et al. |
| 4,310,437 A | 1/1982 | Schreiber |
| 4,322,296 A | 3/1982 | Fan et al. |
| 4,333,893 A | 6/1982 | Clyde |
| 4,373,024 A | 2/1983 | Hunt |
| 4,374,730 A | 2/1983 | Braha et al. |
| 4,385,988 A | 5/1983 | Hypponen |
| 4,394,268 A | 7/1983 | Reid |
| 4,454,038 A | 6/1984 | Shimodaira et al. |
| 4,507,546 A | 3/1985 | Fortune et al. |
| 4,521,311 A | 6/1985 | Fuchs et al. |
| 4,522,767 A | 6/1985 | Billet et al. |
| 4,537,731 A | 8/1985 | Billet et al. |
| 4,561,974 A | 12/1985 | Bernard et al. |
| 4,566,971 A | 1/1986 | Reimann et al. |
| 4,599,174 A | 7/1986 | McDowell |
| 4,620,929 A | 11/1986 | Hofmann |
| 4,664,803 A | 5/1987 | Fuchs et al. |
| 4,810,377 A | 3/1989 | Kato et al. |
| 4,814,085 A | 3/1989 | Fujii et al. |
| 4,814,125 A | 3/1989 | Fujii et al. |
| 4,820,415 A | 4/1989 | Reischl |
| 4,839,053 A | 6/1989 | Tharp |
| 4,842,920 A | 6/1989 | Banai et al. |
| 4,895,645 A | 1/1990 | Zorich, Jr. |
| 4,960,509 A | 10/1990 | McNeill |
| 4,960,540 A | 10/1990 | Friel, Jr. et al. |
| 4,985,182 A | 1/1991 | Basse et al. |
| 4,999,103 A | 3/1991 | Bogart |
| 5,030,353 A | 7/1991 | Stuth |
| 5,041,216 A | 8/1991 | Henzler et al. |
| 5,080,793 A | 1/1992 | Urlings |
| 5,108,655 A | 4/1992 | Johns, Jr. et al. |
| 5,143,618 A | 9/1992 | Hyun et al. |
| 5,168,058 A | 12/1992 | Bohak et al. |
| 5,192,442 A | 3/1993 | Piccirillo et al. |
| 5,200,081 A | 4/1993 | Stuth |
| 5,202,027 A | 4/1993 | Stuth |
| 5,217,616 A | 6/1993 | Sanyal et al. |
| 5,252,231 A | 10/1993 | Capdeville |
| 5,429,740 A | 7/1995 | Van Der Herberg |
| 5,458,779 A | 10/1995 | Odegaard |
| 5,486,292 A | 1/1996 | Bair et al. |
| 5,490,934 A | 2/1996 | Schmid |
| 5,534,141 A | 7/1996 | McAnaney et al. |
| 5,543,039 A | 8/1996 | Odegaard |
| 5,554,289 A | 9/1996 | Grounds |
| 5,558,763 A | 9/1996 | Funakoshi et al. |
| 5,582,733 A * | 12/1996 | Desbos et al. ............... 210/605 |
| 5,599,451 A | 2/1997 | Guiot |
| 5,698,094 A | 12/1997 | Abdellatif et al. |
| 5,702,604 A | 12/1997 | Yamasaki et al. |
| 5,736,047 A | 4/1998 | Ngo |
| 5,766,454 A | 6/1998 | Cox et al. |
| 5,766,459 A | 6/1998 | Adams, Jr. |
| 5,779,886 A | 7/1998 | Couture |
| 5,783,066 A | 7/1998 | Aylmore |
| 5,783,069 A | 7/1998 | Frank |
| 5,783,089 A | 7/1998 | Anderson et al. |
| 5,827,453 A | 10/1998 | Gross et al. |
| 5,871,674 A | 2/1999 | Leva |
| 5,902,484 A | 5/1999 | Timpany |
| 5,908,555 A | 6/1999 | Reinsel et al. |
| 5,928,493 A | 7/1999 | Morkovsky et al. |
| 5,948,262 A | 9/1999 | Todd et al. |
| 5,962,309 A | 10/1999 | Kumagai et al. |
| 5,976,365 A | 11/1999 | Petit |
| 5,980,738 A | 11/1999 | Heitkamp et al. |
| 5,981,272 A | 11/1999 | Chang |
| 5,985,148 A | 11/1999 | Liu |
| 5,993,650 A | 11/1999 | Kim |
| 6,015,497 A | 1/2000 | Steen, Jr. |
| 6,063,268 A | 5/2000 | Jowett |
| 6,063,273 A | 5/2000 | Habets et al. |
| 6,063,863 A | 5/2000 | Yu et al. |
| 6,077,424 A | 6/2000 | Katsukura et al. |
| 6,110,389 A | 8/2000 | Horowitz |
| 6,126,829 A | 10/2000 | Gunnarsson et al. |
| 6,136,194 A | 10/2000 | Vogel et al. |
| 6,156,204 A | 12/2000 | Todd et al. |
| 6,207,722 B1 | 3/2001 | Juen et al. |
| 6,210,578 B1 | 4/2001 | Sagastume et al. |
| 6,534,550 B1 | 3/2003 | Walterick, Jr. |
| 6,565,750 B2 | 5/2003 | Nasr |
| 6,572,774 B2 | 6/2003 | Ricketts |
| 6,616,845 B2 | 9/2003 | Shechter et al. |
| 6,660,164 B1 | 12/2003 | Stover |
| 6,682,653 B2 | 1/2004 | Chuang et al. |
| 6,689,271 B2 | 2/2004 | Morkovsky et al. |
| 6,726,838 B2 | 4/2004 | Shechter et al. |
| 6,942,788 B1 | 9/2005 | Cox et al. |
| 6,960,304 B1 | 11/2005 | Brown et al. |
| 6,962,653 B2 | 11/2005 | Jeong |
| 7,001,519 B2 | 2/2006 | Linden et al. |
| 7,022,233 B2 | 4/2006 | Chen |
| 7,135,110 B2 | 11/2006 | McGrath et al. |
| 7,223,343 B1 | 5/2007 | Cox et al. |
| 7,261,811 B2 | 8/2007 | Nakhla et al. |
| 7,332,077 B2 | 2/2008 | Pollock |
| 7,670,489 B2 | 3/2010 | Torrijos et al. |
| 7,699,177 B2 | 4/2010 | Craig |
| 2002/0179526 A1 | 12/2002 | Shechter et al. |
| 2003/0087969 A1 | 5/2003 | Slone et al. |
| 2003/0098277 A1 | 5/2003 | Khudenko |
| 2003/0111412 A1* | 6/2003 | Jeong et al. ............... 210/605 |
| 2003/0127378 A1 | 7/2003 | Shechter et al. |
| 2004/0089592 A1 | 5/2004 | Shechter et al. |
| 2004/0206699 A1 | 10/2004 | Ho et al. |
| 2005/0167359 A1 | 8/2005 | Wilkie |
| 2006/0124518 A1 | 6/2006 | Monosov et al. |
| 2006/0138048 A1 | 6/2006 | Hu et al. |
| 2006/0186027 A1 | 8/2006 | Geneys et al. |
| 2007/0007202 A1 | 1/2007 | Stuth et al. |
| 2007/0170115 A1 | 7/2007 | Skillicorn |
| 2007/0264704 A1* | 11/2007 | Van Toever ............... 435/262 |
| 2008/0018077 A1 | 1/2008 | Preece et al. |
| 2008/0053897 A1 | 3/2008 | Zhu et al. |
| 2009/0035848 A1 | 2/2009 | Hickey |
| 2010/0180768 A1 | 7/2010 | Folkvang |
| 2011/0027870 A1 | 2/2011 | Assulin et al. |

FOREIGN PATENT DOCUMENTS

| | | |
|---|---|---|
| EP | 0075059 A1 | 3/1983 |
| EP | 0575314 A1 | 12/1993 |
| EP | 0750591 A1 | 1/1997 |
| EP | 1340720 A1 | 9/2003 |
| ES | 2064083 T3 | 1/1995 |
| FR | 2707183 A1 | 1/1995 |
| JP | 54-54453 | 4/1979 |
| JP | 07275886 A | 10/1995 |
| WO | WO-9111396 A1 | 8/1991 |
| WO | WO-9525072 A1 | 9/1995 |
| WO | WO-9533695 A1 | 12/1995 |
| WO | WO-9713727 A1 | 4/1997 |
| WO | WO-02096806 A2 | 12/2002 |
| WO | WO-2007029256 A2 | 3/2007 |

(56) References Cited

FOREIGN PATENT DOCUMENTS

| WO | WO-2008018077 A2 | 2/2008 |
|---|---|---|
| WO | WO-2009107128 A2 | 9/2009 |
| WO | WO-2010026564 A1 | 3/2010 |

OTHER PUBLICATIONS

A. AEsoy et al. "Upgrading Wastewater Treatment Plants by the Use of Biofilm Carriers, Oxygen addition and Pre-Treatment in the Sewer Network", Water Science & Technology, vol. 37 No. 9, 1998.
"AMB Bio Media" 2001, EEC High-Speed Bio Tec.
"Kaldnes™ Moving bed Biofilm Reactor", 1998, The PURAC Group, a Division of the Anglian Water International Ltd., UK.
"The Natrix Process", 1998, The PURAC Group, a Division of the Anglian Water International Ltd., UK.
B. Rusten et al. "Upgrading to Nitrogen Removal With the KMT Moving Bed Biofilm Process", Wat. Sci. Tech., vol. 29, No. 12 1994 pp. 185-195.
BioMatrix Integrated Fixed-Film Activated Sludge (IFAS) System, BioMatrix Technologies, Inc. Jul. 2000.
C. H. Johnson et al.: "Pilot Study to Full Scale Treatment—The Moving Bed Biofilm Reactor Experience at the Phillips 66 Borger Refinery," 2000 Water Environment Federation.
ConorPac Media™ Floating Plastic Media, May 2000.
D.G. Karamanev, "Application of Inverse Fluidization in Wastewater Treatment: From Laboratory to Full-Scale Bioreactors", Environmental Progress, vol. 15 No. 3 pp. 194-196, 1996.
D.S. Parker et al., "A New Process for Enriching Nitrifiers in Activated Sludge through Separate Heterotrophic Wasting From Biofilm Carriers" Brown and Caldwell P.O. Box 8045 Walnut Creek, CA 2000, Water Environment Federation.
Database WPI Week 198730 Derwent Publications Ltd., London, GB; An 1987-209691, XP002381758 & JP 62 136296, Jun. 19, 1987, English abstract.
Database WPI Week 199901 Derwent Publications Ltd., London, GB; An 1999-003480, XP002381759 & JP 10 277536, Oct. 20, 1998, English abstract.
Examination Report dated Mar. 29, 2007, in connection with Indian Patent Application No. 2069CHENP2003.
Examination Report dated May 10, 2010, in connection with European Patent Application No. 02730654.7.
International Preliminary Report on Patentability dated Apr. 7, 2009, in connection with PCT/IL2007/000997.
International Preliminary Report on Patentability dated Mar. 3, 2011, in connection with PCT/IL09/00825.
International Search Report and Written Opinion both dated Jan. 12, 2010, in connection with PCT/IL09/00825.
International Search Report dated May 14, 2009, in connection with PCT/IL2009/000209.
International Search Report dated May 15, 2003, in connection with PCT/IL02/00359.
International Search Report dated May 16, 2008, in connection with PCT/IL2007/000997.
K. Yamagiwa et al.: "Biological treatment of highly foaming pharmaceutical wastewater by modified bubble-column under mechanical foam control", Water Science & Technology, vol. 42 No. 3-4, pp. 331-337, IWA Publishing 2000.
N. Sunner et al. The Two Stage Moving Bed/Activated Sludge Process. An Effective Solution for high Strength Wastes, Water and Environmental Management, vol. 13, No. 5, 1999.
Office Action dated Jul. 22, 2003, in connection with U.S. Appl. No. 10/041,524.
Office Action dated May 23, 2005, in connection with U.S. Appl. No. 10/451,474.
Office Action dated Nov. 25, 2009, in connection with Canadian Patent Application No. 2,449,853.
Office Action dated Oct. 27, 2008, in connection with European Patent Application No. 02730654.7.
S. Takesono et al.: "Performance characteristics of mechanical foambreakers fitted to a stirred-tank reactor", Journal of Chemical Technology & Biotechnology, vol. 78, No. 1, Jan. 2003, pp. 48-55(8).
Shechter et al.: Stimulation Clarification and Endogenous Post Denitrification by Up-Flow Through a Layer of Floating Media. Aqwise—Wise Water Technologies, Ltd., Aqwise Latinoamerica SA, 2006, pp. 1-3.
The Kaldnes Moving Bed Process, 1998, The PURAC Group, a Division of the Anglian Water International Ltd., UK.
The CIRCO® Reactor: The Aerobic Compact Answer to Higher Effluent Quality, Apr. 2001.
Biological Wastewater Systems Division Moving Bed Biofilm Reactor (MBBR); Waterlink Biological Wastewater System Mass., U.S. A., 2000.
U.S. Appl. No. 60/822,115, filed Aug. 11, 2006.
U.S. Appl. No. 61/031,076, filed Feb. 25, 2008.
Written Opinion dated Apr. 3, 2009, in connection PCT/IL2007/000997.
An International Search Report and a Written Opinion both dated Aug. 6, 2013, which issued during the prosecution of Applicant's PCT/IL/050391.
Office Action dated May 14, 2013 issued during the prosecution of U.S. Appl. No. 12/905,917.

\* cited by examiner

INTEGRATED BIOLOGICAL WASTEWATER TREATMENT AND CLARIFICATION

REFERENCE TO RELATED APPLICATIONS

This application is a U.S. National Stage application under 35 U.S.C. 371 based on International Application No. PCT/IL2009/000825, filed Aug. 26, 2009, which claims priority to U.S. Provisional Patent Application Ser. No. 61/191,023, filed Sep. 3, 2008 and entitled INTEGRATED BIOLOGICAL WASTEWATER TREATMENT AND CLARIFICATION, each of which is hereby incorporated by reference in its entirety.

Reference is also made to the following U.S. patents and patent applications of Assignee: U.S. Pat. No. 6,616,845; U.S. Pat. No. 6,726,838; PCT Patent Publication No. WO 02/096806; PCT Patent Publication No. WO 2007/029256; PCT Patent Publication No. WO 2008/018077 and PCT Patent Application No. PCT/IL2009/000209, the disclosures of which are hereby incorporated by reference.

FIELD OF THE INVENTION

The present invention relates to water treatment generally and more particularly to biological wastewater treatment systems and methodologies.

BACKGROUND OF THE INVENTION

The following publications are believed to represent the current state of the art:

U.S. Pat. Nos. 4,310,437; 4,373,024; 4,507,546; 4,960,540; 5,108,655; 5,783,089; 5,827,453; 5,928,493; 6,207,722; 6,534,550; 6,616,845; 6,660,164; 6,689,271; 6,726,838; 6,960,304; 6,962,653; 7,001,519; 4,279,753; 6,110,389; 4,322,296; 4,620,929; 6,565,750; 3,506,125; 4,810,377; 5,080,793; 5,458,779; 4,188,289; 3,133,017; 1,790,975; 2,709,128; 5,779,886; 5,490,934; 6,726,838; 3,957,931; 4,179,366; 4,333,893; 4,385,988; 4,522,767; 4,537,731; 4,814,085; 4,814,125; 4,842,920; 4,985,182; 4,999,103; 5,168,058; 5,192,442; 5,200,081; 5,217,616; 5,429,740; 5,486,292; 5,543,039; 5,558,763; 5,783,066; 5,783,069; 5,871,674; 5,902,484; 5,948,262; 5,962,309; 5,980,738; 5,981,272; 5,985,148; 5,993,650; 6,015,497; 6,063,268; 6,077,424; 6,126,829; 6,136,194; 6,156,204; 6,210,578; 4,137,171; 4,045,344; 3,133,017; 4,394,268; 4,521,311; 5,554,289; 4,566,971; 4,820,415; 6,063,863; 4,839,053; 4,599,174; 4,231,863; 4,374,730; 5,030,353; 5,202,027; 5,698,094; 4,256,573; 4,454,038; 1,498,360; 7,261,811; 7,332,077; 3,788,477; 5,534,141; 5,736,047; 5,766,459; 6,572,774; 6,942,788 and 7,223,343, and U.S. Published Patent Application Nos.: 2003/0087969 and 2004/0089592, and Non-US Patent Nos.: DE 39 16 520; FR 2 707 183; ES 2 064 083; EP 0 575 314; EP 0 750 591 and EP 1 340 720;

PCT Patent Publication Nos.: WO 95/33695; WO 91/11396 and WO 95/25072, and

Other Publications:

"Biological treatment of highly foaming pharmaceutical wastewater by modified bubble-column under mechanical foam control", K. Yamagiwa, M. Yoshida, A. Ohkawa and S. Takesono, Water Science & Technology, Vol 42 No 3-4, pp 331-337, IWA Publishing 2000;

"Performance characteristics of mechanical foam-breakers fitted to a stirred-tank reactor", Takesono S., Onodera M., Yoshida M., Yamagiwa K., Ohkawa A., Journal of Chemical Technology & Biotechnology, Volume 78, Number 1, January 2003, pp. 48-55(8);

Database WPI Week 198730 Derwent Publications Ltd., London, GB; An 1987-209691, XP002381758 & JP 62 136296, 19 Jun. 1987, an abstract;

Database WPI Week 199901 Derwent Publications Ltd., London, GB; An 1999-003480, XP002381759 & JP10 277536, 20 Oct. 1998, an abstract, and Patent Abstracts of Japan Vol. 1996, no. 2, 29 Feb. 1996 & JP 07 275886, 24 Oct. 1995.

SUMMARY OF THE INVENTION

The present invention seeks to provide improved systems and methodologies for biological wastewater treatment.

There is thus provided in accordance with a preferred embodiment of the present invention apparatus for integrated biological wastewater treatment and clarification including a tank having a wastewater inlet for receiving wastewater to be treated and having a treated, clarified wastewater outlet for providing treated, clarified wastewater for use, the tank having an upper turbulence region, a lower solids settling region below the upper turbulence region and a sludge collection region below the lower solids settling region, a multiplicity of biomass carriers disposed in the upper turbulence region, a gas diffuser assembly arranged generally between the upper turbulence region and the lower solids settling region for providing gas bubbles which move upwardly through the wastewater and the biomass carriers in the upper turbulence region, providing turbulence and oxygen and a sludge removal conduit communicating with the sludge collection region for removal of sludge therefrom.

Preferably, the wastewater inlet communicates with the tank at the lower solids settling region, below the gas diffuser assembly. Additionally or alternatively, the apparatus also includes a clarification enhancement agent inlet for supplying a clarification enhancement agent to the wastewater. In accordance with a preferred embodiment of the present invention the clarification enhancement agent inlet communicates with at least one of the wastewater inlet and the interior of the upper turbulence region.

Preferably, the gas diffuser assembly includes at least one gas inlet, piping suitable for carrying pressurized gas and arranged in a generally planar arrangement and a multiplicity of gas diffuser outlets disposed along the piping. Additionally, the gas diffuser outlets include at least one of coarse, fine and jet bubble diffusers.

In accordance with a preferred embodiment of the present invention the gas diffuser assembly is operative to create multiple adjacent pairs of curtains of bubbles that lie generally perpendicular to the direction of flow of the wastewater from the inlet to the outlet.

Preferably, the gas is air. In accordance with a preferred embodiment of the present invention the density of the biomass carriers is such that even when the diffuser assembly is not operative the carriers tend to float in the upper turbulence region. Preferably, a wedge wire screen is coupled to the wastewater outlet.

In accordance with a preferred embodiment of the present invention the tank is configured to define a generally cylindrical upper portion accommodating the upper turbulence region, lying above the lower solids settling region and separated therefrom by the gas diffuser assembly, and a generally conical bottom portion accommodating the sludge collection region, at the bottom of which is provided the sludge removal conduit. Alternatively, the tank is configured to define a generally cylindrical upper portion, accommodating the upper turbulence region lying above the lower solids settling region and separated therefrom by the gas diffuser assembly, and a generally cylindrical bottom portion having a flat bottom and accommodating the sludge collection region at the bottom of which is provided the sludge removal conduit, and the apparatus also includes a multiplicity of mechanical agitators to prevent anaerobic conditions and to assist in the outflow of sludge through the sludge removal conduit.

In another alternative embodiment of the present invention the tank is configured to define a generally cylindrical upper portion, accommodating the upper turbulence region lying above the lower solids settling region and separated therefrom by the gas diffuser assembly, and a generally sloped bottom portion having an inclined bottom surface and accommodating the sludge collection region at the bottom of which is provided the sludge removal conduit. Further alternatively, the tank is configured to define a generally cylindrical upper portion, accommodating the upper turbulence region lying above the lower solids settling region and separated therefrom by the gas diffuser assembly, and a bottom portion having a multiplicity of conical regions accommodating the sludge collection region at the bottom of which is provided the sludge removal conduit.

In accordance with a preferred embodiment of the present invention the apparatus is provided in a stand-alone single stage. Alternatively, the apparatus is arranged downstream of at least one of an aerobic, an anoxic and an anaerobic wastewater treatment stage. In a further alternative embodiment the apparatus is arranged downstream of a multiplicity of wastewater treatment stages including at least two of an aerobic, an anaerobic and an anoxic wastewater treatment stage. Further alternatively, multiple tanks are arranged in a multiple stage series arrangement.

Preferably, at least one of the wastewater treatment stages employs biomass carriers. Additionally or alternatively, the apparatus also includes a sludge conduit enabling sludge from the tank to be recycled to any of the wastewater treatment stages.

There is also provided in accordance with another preferred embodiment of the present invention a method for integrated biological wastewater treatment and clarification including providing a bioreactor having located therewithin a multiplicity of biomass carriers, receiving, at a wastewater inlet of the bioreactor, wastewater to be treated and providing treated, clarified wastewater at a fluid outlet of the bioreactor.

In accordance with a preferred embodiment of the present invention the bioreactor operates in at least one of an aerobic, an anoxic and an anaerobic mode of operation. Additionally, the at least one of the aerobic, the anoxic and the anaerobic mode of operation does not employ biomass carriers.

In accordance with a preferred embodiment of the present invention the method also includes creating turbulence between the fluid and the biomass carriers. Additionally or alternatively, the method also includes supplying oxygen to biomass attached on the biomass carriers.

In accordance with a preferred embodiment of the present invention the method also includes creating multiple adjacent pairs of curtains of bubbles lying generally perpendicular to the direction of flow of the wastewater from the inlet to the outlet. Preferably, the method also includes creating settling of solids.

In accordance with a preferred embodiment of the present invention the method also includes collecting and removing sludge. Alternatively, the method also includes recycling the sludge.

Preferably, the method also includes supplying a clarification enhancement agent to the wastewater.

In accordance with a preferred embodiment of the present invention the method also includes filtering the wastewater to remove at least one of large inorganic matter and non-biodegradable organic compounds, anaerobically degrading accumulated sludge, aerobically degrading soluble products produced by the anaerobic sludge degradation and neutralizing malodorous compounds released by the anaerobic sludge degradation.

There is further provided in accordance with yet another preferred embodiment of the present invention a method for integrated biological wastewater treatment and clarification including providing a bioreactor having located therewithin a multiplicity of biomass carriers, receiving at a wastewater inlet of the bioreactor, wastewater to be treated, filtering the wastewater to remove at least one of large inorganic matter and non-biodegradable organic compounds, creating settling of solids, anaerobically degrading settled solids, aerobically degrading soluble products produced by the anaerobic solids degradation, neutralizing malodorous compounds released by the anaerobic solids degradation and providing treated, clarified wastewater at a fluid outlet of the bioreactor.

Preferably, the filtering, anaerobically degrading and aerobically degrading are repeated at least once.

In accordance with a preferred embodiment of the present invention the method also includes preventing solidification of the settled solids. Preferably, the method also includes preventing exposure of the settled solids to oxygen.

In accordance with a preferred embodiment of the present invention the method also includes collecting and removing sludge. Additionally or alternatively, the method also includes recycling the sludge.

Preferably, the method also includes supplying a phosphate settling agent to the wastewater.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
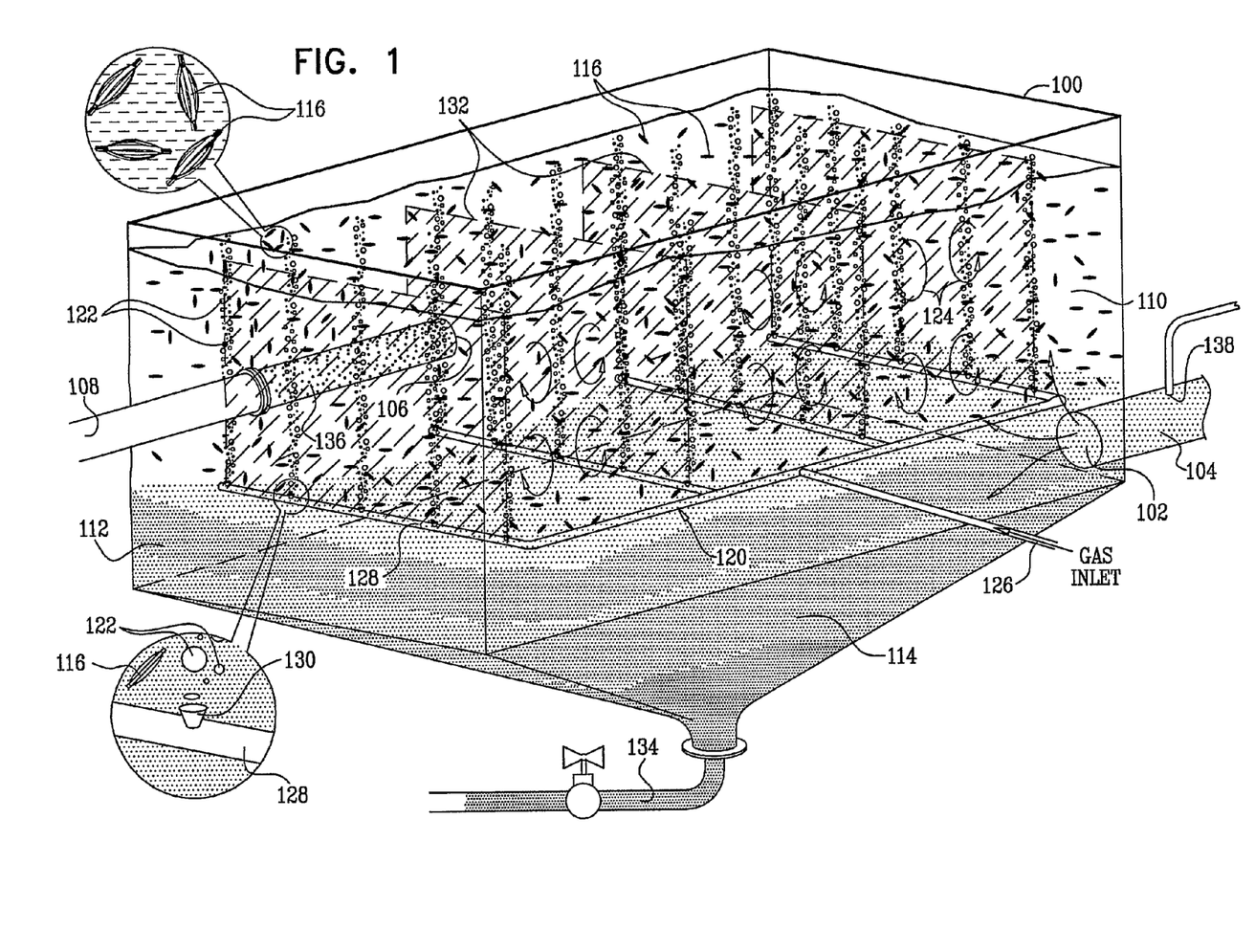
FIG. 1 is a simplified illustration of apparatus for integrated biological wastewater treatment and clarification.

Reference is now made to FIG. 1, which is a simplified illustration of apparatus for integrated biological wastewater treatment and clarification constructed and operative in accordance with a preferred embodiment of the present invention.

As seen in FIG. 1, the apparatus preferably includes a tank 100 having a wastewater inlet 102, preferably coupled to a wastewater inlet conduit 104, for receiving wastewater to be treated. The wastewater is typically municipal or industrial wastewater. The tank 100 has a treated, clarified wastewater outlet 106 coupled to a treated, clarified wastewater conduit 108, for providing treated, clarified wastewater for use, such as certain agricultural or industrial uses.

It is a particular feature of the present invention that the interior of tank 100 includes an upper turbulence region, here designated by reference numeral 110, a lower solids settling region, here designated by reference numeral 112, lying below the upper turbulence region 110 and a sludge collection region, here designated by reference numeral 114, lying below the lower solids settling region 112.

A multiplicity of biomass carriers 116 are disposed in the upper turbulence region. Carriers 116 may be biomass carriers of the type described in assignee's U.S. Pat. No. 6,726,838 and are preferably biomass carriers of the type described in assignee's PCT Patent Application No. PCT/IL2009/000209, the disclosure of which is hereby incorporated by reference.

A gas diffuser assembly 120 is arranged generally between the upper turbulence region 110 and the lower solids settling region 112 for providing gas bubbles 122, which move upwardly through wastewater in the tank and through the biomass carriers 116 in the upper turbulence region 110, providing turbulent motion of the wastewater in region 110, as indicated generally by arrows 124 and oxygenating the wastewater in region 110. Gas, typically pressurized air, is supplied to the gas diffuser assembly 120 via a gas inlet 126. Gas diffuser assembly 120 preferably includes suitable piping 128 having a multiplicity of gas diffuser outlets 130 disposed therealong. The gas diffuser outlets 130 may include any one or more of coarse and fine bubble diffusers and jets.

Preferably, the arrangement of the gas diffuser assembly 120 relative to the direction of flow of the wastewater from the inlet 102 to the outlet 106 is such that multiple adjacent pairs of curtains of bubbles, here designated by reference numeral 132, lie perpendicular to the direction of flow, as described in U.S. Pat. No. 6,077,424, the disclosure of which is hereby incorporated by reference.

A sludge removal conduit 134 preferably communicates with the sludge collection region 114 for removal of sludge therefrom.

Preferably, a wedge wire screen 136 is coupled to the wastewater outlet 106 in order to prevent carriers 116 from entering conduit 108.

Preferably, the wastewater inlet 102 communicates with the interior of tank 100 at the lower solids settling region 112, below the gas outlets 130 of gas diffuser assembly 120.

A clarification enhancement agent inlet 138 is preferably provided for supplying a clarification enhancement agent, such as a suitable coagulant or polymer, for example, ferric chloride or aluminum sulfate, to the wastewater. Inlet 138 may communicate with wastewater inlet 102, as shown, and, additionally or alternatively, may communicate with the interior of tank 100 at upper turbulence region 110.

It is a particular feature of the present invention that the gas outlets 130 of the diffuser assembly 120 all lie generally in a plane and effectively divide the interior of tank 100 into the upper turbulence region 110, lying above the gas outlets 130, which constitutes a biological reactor and the lower solids settling region 112, lying below the gas outlets 130. Normally the action of the diffuser assembly 120 does not permit the carriers 116 to be located below the gas outlets 130. Furthermore, the density of the biomass carriers 116 is preferably such that, even when the diffuser assembly 120 is not operative, the carriers 116 tend to float in the upper turbulence region 110.

Reference is now made to FIGS. 2A, 2B, 2C & 2D, which are simplified illustrations of various alternative structures for the base of the apparatus of FIG. 1.

Figure 2A:
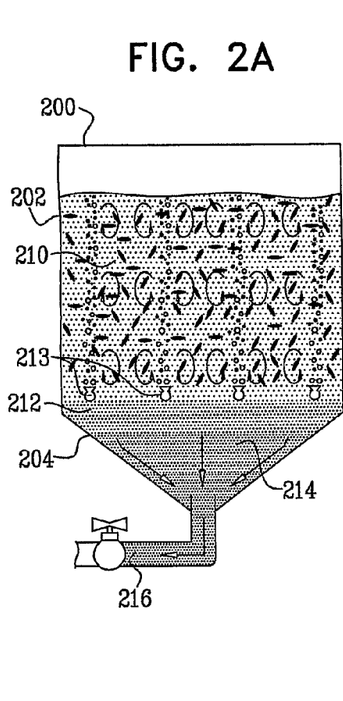
FIGS. 2A, 2B, 2C & 2D are simplified illustrations of various alternative structures for the base of the apparatus of FIG. 1.

In the embodiment of FIG. 2A, a tank 200 includes a generally cylindrical upper portion 202 and a generally conical bottom portion 204. Upper portion 202 accommodates an upper turbulence region 210, lying above a lower solids settling region 212 and separated therefrom by a generally planar array of diffusers 213. Bottom portion 204 accommodates a sludge collection region 214, at the bottom of which is provided a sludge removal conduit 216.

Figure 2B:
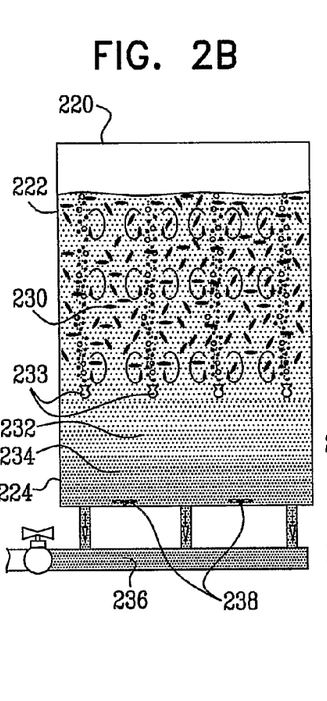

In the embodiment of FIG. 2B, a tank 220 includes a generally cylindrical upper portion 222 and a generally cylindrical bottom portion 224 having a flat bottom. Upper portion 222 accommodates an upper turbulence region 230, lying above a lower solids settling region 232 and separated therefrom by a generally planar array of diffusers 233. Bottom portion 224 accommodates a sludge collection region 234, at the bottom of which is provided a sludge removal conduit 236. A multiplicity of mechanical agitators 238 are preferably provided in bottom portion 224 to prevent anaerobic conditions and to assist in the outflow of the sludge through conduit 236. Alternatively, a gas diffuser assembly, such as gas diffuser assembly 120, may be provided in bottom portion 224 to prevent anaerobic conditions and to assist in the outflow of the sludge through conduit 236.

Figure 2C:
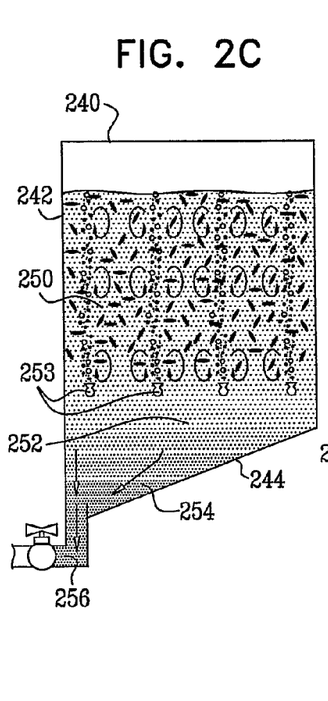

In the embodiment of FIG. 2C, a tank 240 includes a generally cylindrical upper portion 242 and a generally sloped bottom portion 244 having an inclined bottom surface. Upper portion 242 accommodates an upper turbulence region 250, lying above a lower solids settling region 252 and separated therefrom by a generally planar array of diffusers 253. Bottom portion 244 accommodates a sludge collection region 254, at the bottom of which is provided a sludge removal conduit 256.

Figure 2D:
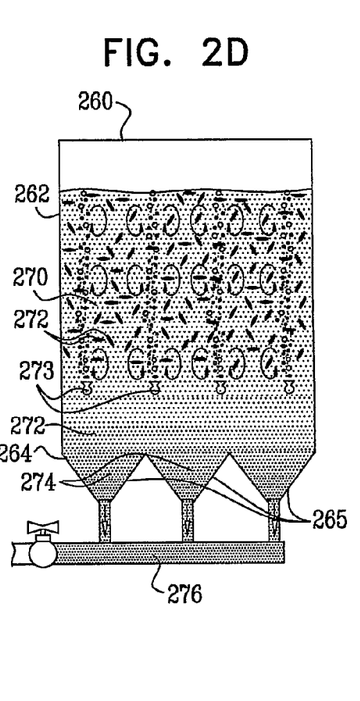

In the embodiment of FIG. 2D, a tank 260 includes a generally cylindrical upper portion 262 and a bottom portion 264 having a multiplicity of conical regions 265. Upper portion 262 accommodates an upper turbulence region 270, lying above a lower solids settling region 272 and separated therefrom by a generally planar array of diffusers 273. Bottom portion 264 accommodates a sludge collection region 274, at the bottom of which is provided a sludge removal conduit 276.

Reference is now made to FIGS. 3A-3E, which illustrates various arrangements of the apparatus of FIGS. 1-2B in various water treatment environments.

Figure 3A:
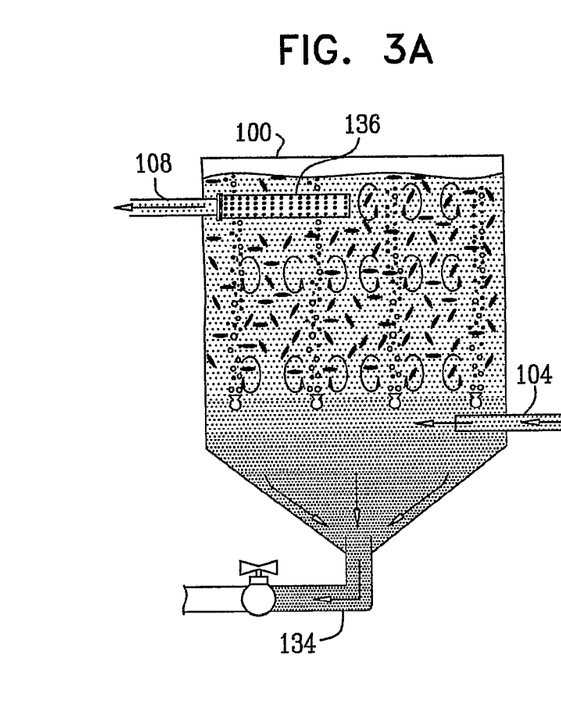
FIG. 3A is a simplified illustration of the apparatus of FIG. 1 arranged for stand-alone operation.

FIG. 3A shows the apparatus of FIG. 1 in a stand-alone arrangement which produces treated and clarified wastewater in a single stage.

Figure 3B:
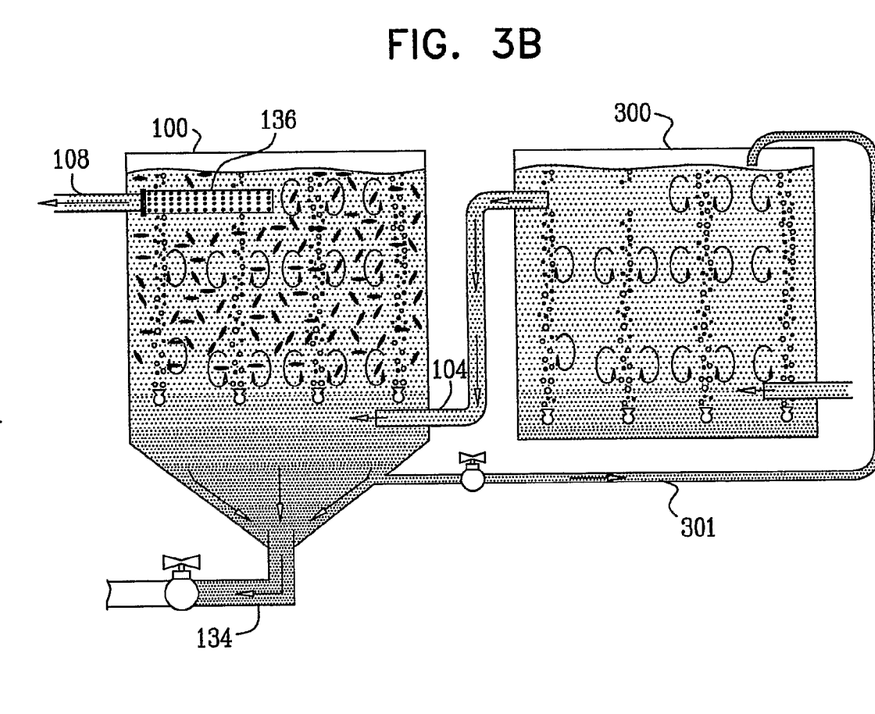
FIG. 3B is a simplified illustration of the apparatus of FIG. 1 arranged downstream of an aerobic wastewater treatment stage.

FIG. 3B shows the apparatus of FIG. 1 arranged downstream of an aerobic wastewater treatment stage 300. Stage 300 may be any suitable aerobic wastewater treatment stage and is preferably an aerobic wastewater treatment stage as described in assignee's U.S. Pat. No. 6,616,845, the disclosure of which is hereby incorporated by reference. In the illustrated embodiment, biomass carriers are not employed in stage 300 and sludge from tank 100 may be recycled to stage 300 via a sludge conduit 301. Alternatively, biomass carriers may be employed in stage 300 and recycling of the sludge may be obviated.

Figure 3C:
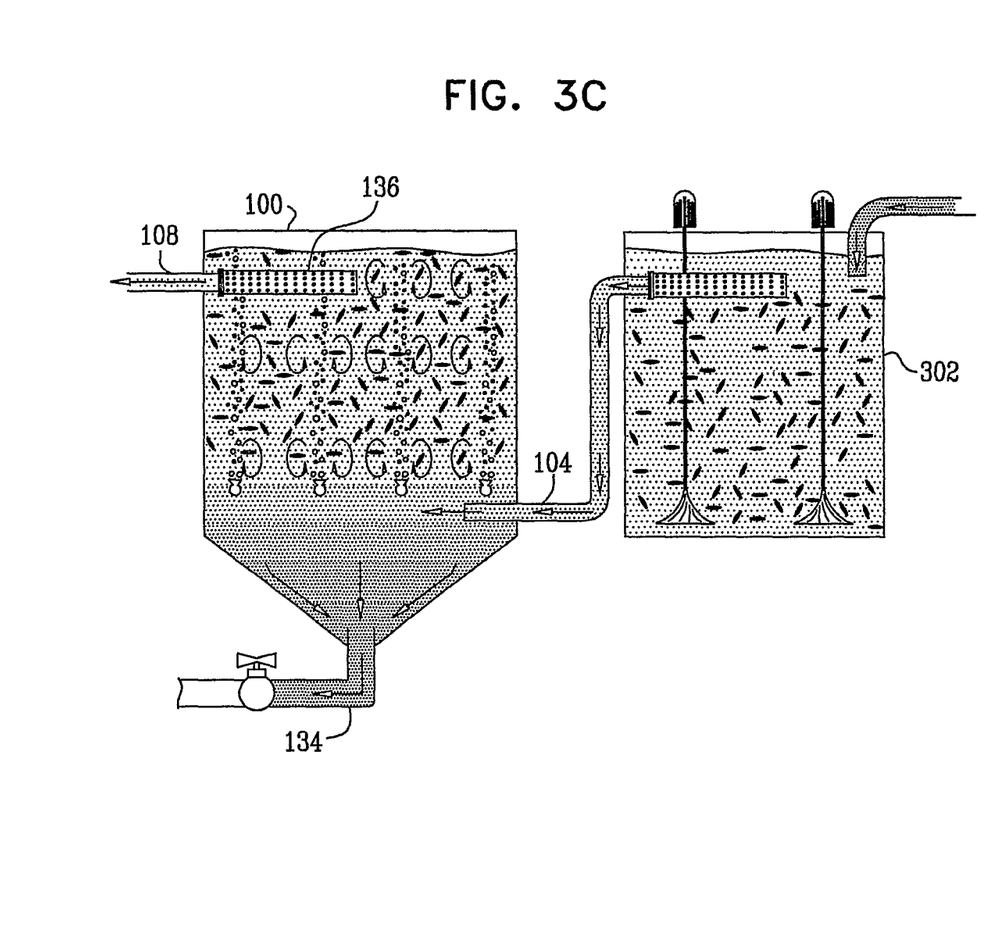
FIG. 3C is a simplified illustration of the apparatus of FIG. 1 arranged downstream of an anoxic or anaerobic wastewater treatment stage.

FIG. 3C shows the apparatus of FIG. 1 arranged downstream of an anoxic or anaerobic wastewater treatment stage 302. Stage 302 may be any suitable anoxic or anaerobic wastewater treatment stage, which may or may not employ biomass carriers, and is preferably an anoxic or anaerobic wastewater treatment stage as described in assignee's published PCT Patent Application No. WO 2008/018077, the disclosure of which is hereby incorporated by reference.

Figure 3D:
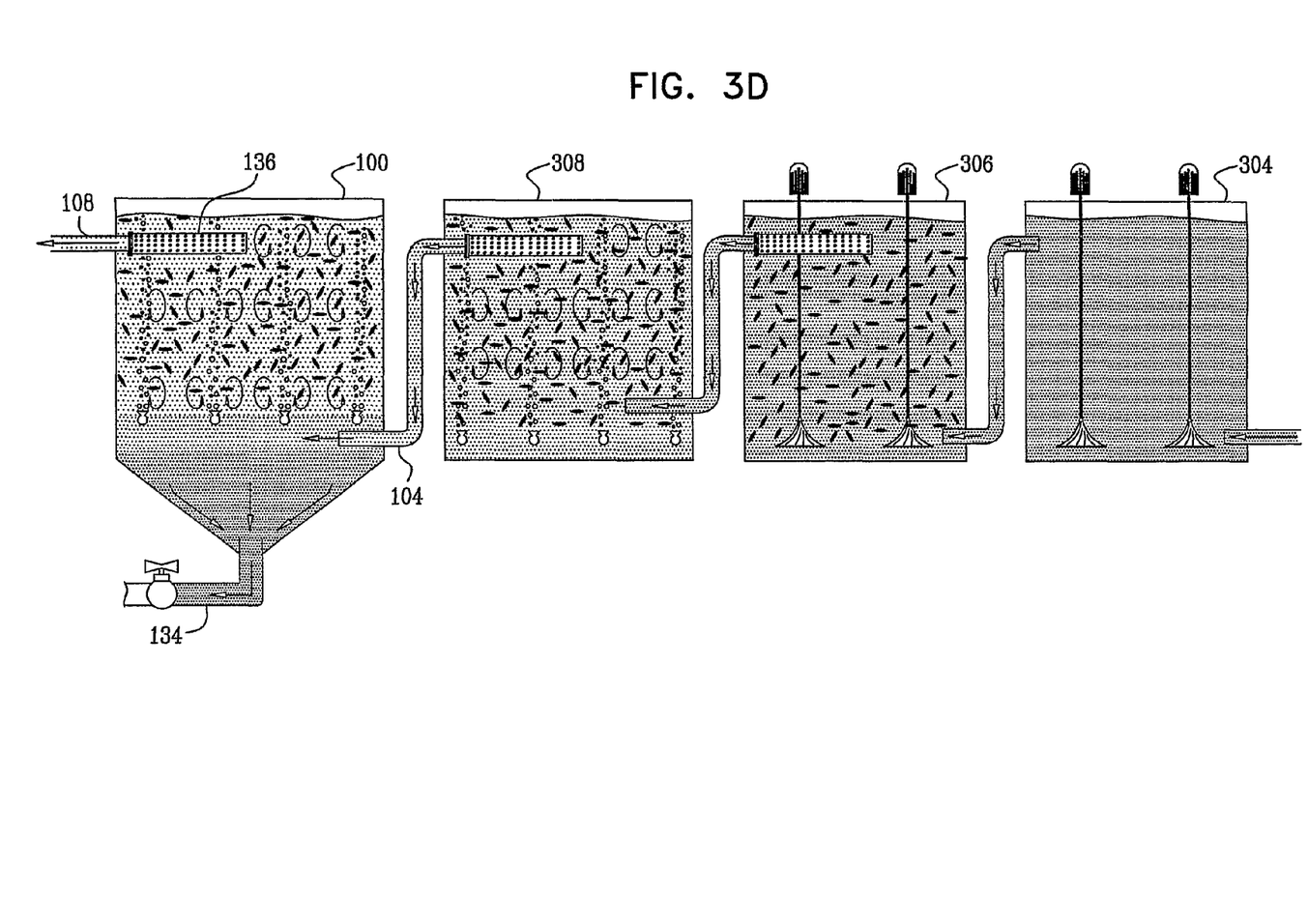
FIG. 3D is a simplified illustration of the apparatus of FIG. 1 arranged downstream of multiple aerobic, anaerobic or anoxic wastewater treatment stages.

FIG. 3D shows the apparatus of FIG. 1 arranged downstream of multiple aerobic, anaerobic or anoxic wastewater treatment stages. In the illustrated embodiment an initial anaerobic stage 304 is followed by an anoxic stage 306 and an aerobic stage 308, which stages are preferably as described in assignee's published PCT Patent Application No. WO 2008/018077, the disclosure of which is hereby incorporated by reference. The order of the stages 304, 306 and 308 may be changed, one or more of the aerobic, anaerobic and anoxic stages may be obviated and additional aerobic, anaerobic or anoxic stages may be provided.

In the illustrated embodiment, biomass carriers may not be employed in one or more of stages 304, 306 and 308 and sludge from tank 100 may be recycled to such stages via a sludge conduit (not shown). Alternatively, biomass carriers may be employed in one or more of stages 304, 306 and 308 and recycling of the sludge may be obviated.

Figure 3E:
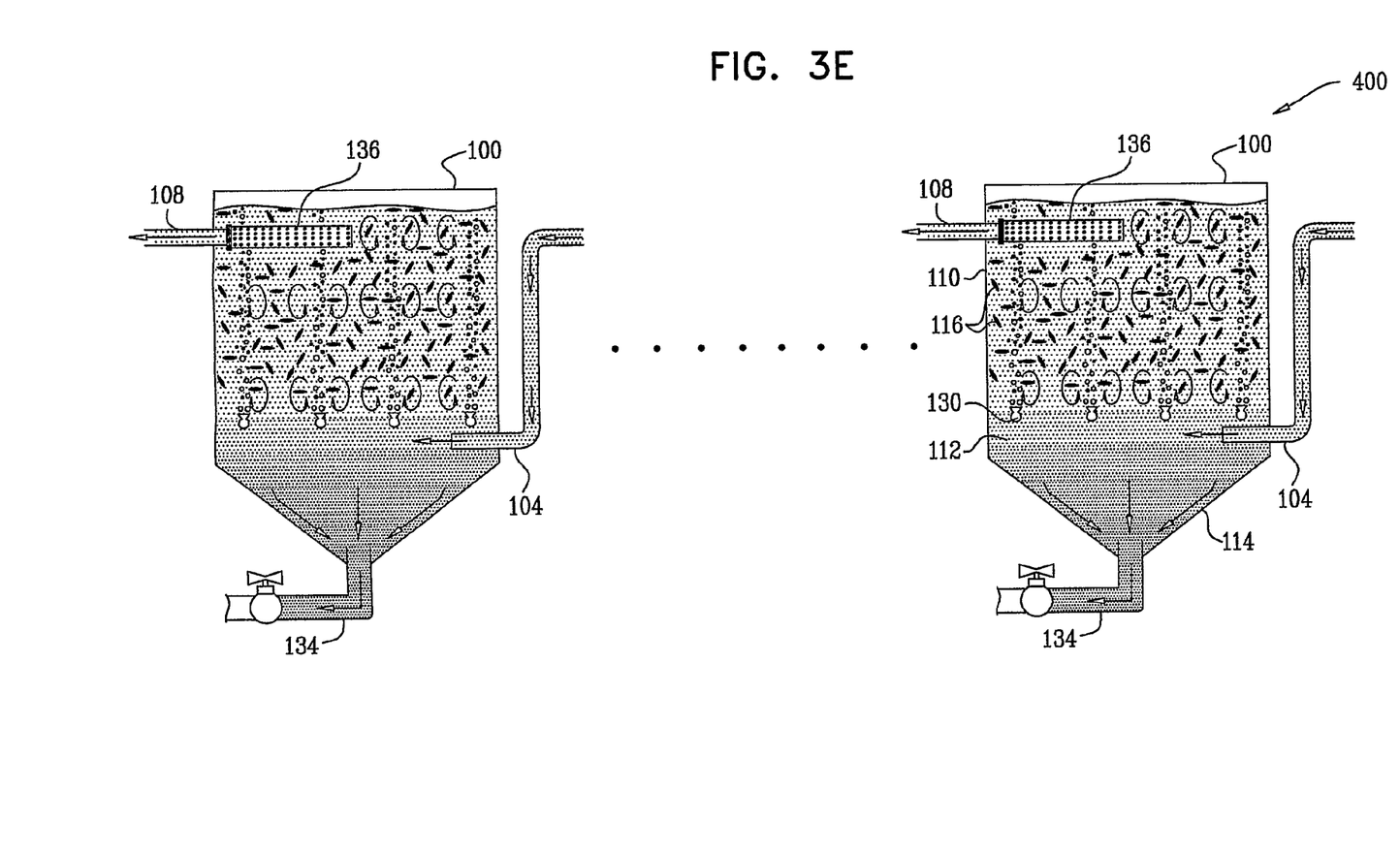
FIG. 3E is a simplified illustration of the apparatus of FIG. 1 embodied in a multiple stage arrangement.

FIG. 3E shows the apparatus of FIG. 1 embodied in a multiple stage arrangement wherein multiple tanks 100 as described hereinabove with reference to FIGS. 1-2D are arranged one after the other in series.

It is a particular feature of the present invention that the multiple stage arrangement as illustrated in FIG. 3E employs a sludge minimization process which includes one or more of the following treatment phases:

A filtration phase including filtering of wastewater entering first stage 400 by employing a filtration unit with a mesh range of 100-1000 μm (not shown) to remove large inorganic matter or non-biodegradable organic compounds such as sand, hair, seeds and shells. The remaining sludge settles in lower solids settling region 112 and accumulates in sludge collection region 114.

An anaerobic sludge degradation phase including anaerobic digestion of the accumulating sludge. Preferably, the anaerobic process yield is very low and expressed by the following expression:

Sludge Yield=approximately 0.05 gr VSS/1 gr COD removed wherein COD (Chemical Oxygen Demand) represents the solids in the wastewater entering first stage 400 and VSS (Volatile Suspended Solids) represents the sludge remaining at the end of the sludge minimization process. As demonstrated by the expression, the anaerobic process dramatically reduces the amount of accumulated sludge.

An aerobic sludge degradation phase including aerobic processes that degrade the soluble products produced by the anaerobic sludge degradation phase and diffused to the aerated upper turbulence region 110. Any malodorous compounds (such as $H_2S$) which may be released by the anaerobic sludge degradation phase are oxidized and neutralized in the aerated upper turbulence region 110 thus preventing malodors.

Preferably, sludge produced by the wastewater sludge minimization process may enter one or more cycles of the aforementioned treatment phases. Gas produced during the anaerobic sludge degradation phase forces solids accumulated in sludge collection region 114 to rise and enter upper turbulence region 110. Biomass carriers 116 in upper turbulence region 110 further degrade and breakdown the solids in upper turbulence region 110 resulting in reduction of the volume of settling sludge and the levels of accumulation thereof in sludge collection region 114.

Alternatively, sludge may be prevented from solidifying and forced to reenter additional cycles of treatment phases by employing a gas diffuser assembly, similar to gas diffuser assembly 120, positioned in sludge collection region 114.

Preferably, the accumulated sludge in sludge collection region 114 is maintained at a level sufficiently low to prevent sludge exposure to oxygen from diffusers 130 or from upper turbulence region 110. Such exposure would disrupt the anaerobic sludge degradation phase of the sludge minimization process.

It will be appreciated that implementation of the sludge minimization process in a multiple stage arrangement as shown in FIG. 3E will bring about gradual reduction in the level of accumulated sludge in sludge collection regions 114 of wastewater treatment stages 100 downstream from first stage 400.

It will also be appreciated that implementation of the sludge minimization process in a multiple stage arrangement does not obviate implementation of the process in a stand-alone wastewater treatment stage 100 as illustrated in FIG. 3A.

Preferably, sludge from any of wastewater treatment stages 100 is removed through sludge removal conduit 134 or, alternatively, recycled to any of wastewater treatment stages 100 upstream. The recycled sludge is entered directly below gas diffuser assembly 120, where it reenters the sludge minimization process.

Additionally, when the sludge minimization process requires the removal of phosphate, chemicals such as $FeCl_3$ may be added to the most downstream wastewater treatment stage 100 to facilitate in the settling of phosphate followed by removal of phosphate-containing sludge therefrom.

It will be appreciated by persons skilled in the art that the present invention is not limited by what has been particularly shown and described hereinabove. Rather the scope of the present invention includes both combinations and subcombinations of the various features described hereinabove as well as modifications and variations thereof which would occur to persons skilled in the art upon reading the foregoing description and which are not in the prior art.

The invention claimed is:

1. Apparatus for integrated biological wastewater treatment and clarification comprising:
   a tank having a wastewater inlet for receiving wastewater to be treated and having a treated, clarified wastewater outlet for providing treated, clarified wastewater for use, said tank having an upper turbulence region, a lower solids settling region below said upper turbulence region and a sludge collection region below said lower solids settling region;
   a multiplicity of biomass carriers disposed in said upper turbulence region;
   a gas diffuser assembly arranged generally between said upper turbulence region and said lower solids settling region for providing gas bubbles which move upwardly through said wastewater and said biomass carriers in said upper turbulence region, providing turbulence and oxygen; and
   a sludge removal conduit communicating with said sludge collection region for removal of sludge therefrom.

2. Apparatus for integrated biological wastewater treatment according to claim 1 and wherein said wastewater inlet communicates with said tank at said lower solids settling region, below said gas diffuser assembly.

3. Apparatus for integrated biological wastewater treatment according to claim 1 and wherein said gas diffuser assembly comprises:
   at least one gas inlet;
   piping suitable for carrying pressurized gas and arranged in a generally planar arrangement; and
   a multiplicity of gas diffuser outlets disposed along said piping.

4. Apparatus for integrated biological wastewater treatment according to claim 1 and wherein said gas diffuser assembly is operative to create multiple adjacent pairs of curtains of bubbles that lie generally perpendicular to the direction of flow of said wastewater from said inlet to said outlet.

5. Apparatus for integrated biological wastewater treatment according to claim 1 and wherein the density of said biomass carriers is such that even when said diffuser assembly is not operative said carriers tend to float in said upper turbulence region.

6. Apparatus for integrated biological wastewater treatment according to claim 1 and wherein a wedge wire screen is coupled to said wastewater outlet.

7. A method for integrated biological wastewater treatment and clarification comprising:
   providing a bioreactor having located therewithin a multiplicity of biomass carriers, said bioreactor including an upper turbulence region, a lower solids settling region below said upper turbulence region and a sludge collection region below said lower solids settling region, said biomass carriers being disposed in said upper turbulence region;
   receiving, at a wastewater inlet of said bioreactor, wastewater to be treated;
   providing gas bubbles, between said upper turbulence region and said lower solids settling region, which move upwardly through said wastewater and said biomass carriers in said upper turbulence region thereby creating turbulence between said wastewater and said biomass carriers and supplying oxygen to biomass on said biomass carriers; and
   providing treated, clarified wastewater at a fluid outlet of said bioreactor.

8. A method for integrated biological wastewater treatment and clarification according to claim 7 and wherein said bioreactor operates in at least one of an aerobic, an anoxic and an anaerobic mode of operation.

9. A method for integrated biological wastewater treatment and clarification according to claim 7 and also comprising creating multiple adjacent pairs of curtains of bubbles lying generally perpendicular to the direction of flow of said wastewater from said inlet to said outlet.

10. A method for integrated biological wastewater treatment and clarification according to claim 7 and also comprising collecting and removing sludge.

11. A method for integrated biological wastewater treatment according to claim 10 and wherein also comprising recycling said sludge.

12. A method for integrated biological wastewater treatment and clarification according to claim 7 and also comprising supplying a clarification enhancement agent to said wastewater.

13. A method for integrated biological wastewater treatment and clarification comprising:
   providing a bioreactor having located therewithin a multiplicity of biomass carriers;
   receiving at a wastewater inlet of said bioreactor, wastewater to be treated;
   filtering said wastewater to remove at least one of large inorganic matter and non-biodegradable organic compounds;
   creating settling of solids;
   anaerobically degrading settled solids;
   aerobically degrading soluble products produced by said anaerobic solids degradation;
   neutralizing malodorous compounds released by said anaerobic solids degradation; and
   providing treated, clarified wastewater at a fluid outlet of said bioreactor.

14. A method for integrated biological wastewater treatment and clarification according to claim 13 and wherein said filtering, anaerobically degrading and aerobically degrading are repeated at least once.

15. A method for integrated biological wastewater treatment and clarification according to claim 13 and also comprising preventing solidification of said settled solids.

16. A method for integrated biological wastewater treatment and clarification according to claim 13 and also comprising preventing exposure of said settled solids to oxygen.

17. A method for integrated biological wastewater treatment and clarification according to claim 13 and also comprising supplying a phosphate settling agent to said wastewater.

* * * * *